United States Patent [19]

Stanulis

[11] Patent Number: 4,990,886

[45] Date of Patent: Feb. 5, 1991

[54] VEHICLE BRAKE INDICATOR SYSTEM

[76] Inventor: James Stanulis, 3360 Justis St., Virginia Beach, Va. 23464

[21] Appl. No.: 451,597

[22] Filed: Dec. 18, 1989

[51] Int. Cl.⁵ .................................................. B60Q 1/44
[52] U.S. Cl. ..................................... 340/467; 340/479; 200/82 D; 200/61.89
[58] Field of Search ............... 340/467, 479, 464, 452; 200/82 D, 61.89, 82 R

[56] References Cited

U.S. PATENT DOCUMENTS

| | | | |
|---|---|---|---|
| 2,064,179 | 12/1936 | Ragsdale | 200/82 R |
| 2,971,067 | 2/1961 | Ticknor | 340/467 X |
| 3,019,415 | 1/1962 | Marion, Sr. | 340/479 |
| 3,104,293 | 9/1963 | Rendler | 200/82 R X |
| 3,461,424 | 8/1969 | Kayuha, Jr. | 340/467 |
| 3,559,164 | 1/1971 | Bancroft et al. | 340/467 |
| 3,774,152 | 11/1973 | Tandy . | |
| 3,949,361 | 4/1976 | Replogle . | |
| 3,952,284 | 4/1976 | Martin | 340/479 |
| 4,470,036 | 9/1984 | Doerr . | |
| 4,631,516 | 12/1986 | Clinker . | |
| 4,812,807 | 3/1989 | Davis . | |
| 4,878,041 | 10/1989 | Leigh-Monstevens et al. | 200/61.89 X |
| 4,918,424 | 4/1990 | Sykora | 340/464 |

FOREIGN PATENT DOCUMENTS 2012484  9/1971  Fed. Rep. of Germany ...... 340/479

Primary Examiner—Joseph A. Orsino
Assistant Examiner—Brian R. Tumm

[57] ABSTRACT

An automotive alarm system that provides the driver of a following vehicle with two different brake signals, related to the foot pressure that the driver of the leading vehicle is applying to his brake pedal. The multi-signal brake signal system alerts the driver in the following vehicle when the leading vehicle is undergoing a panic stop action, thereby enabling the driver in the following vehicle to possibly avoid a rear end collision with the leading vehicle.

1 Claim, 1 Drawing Sheet

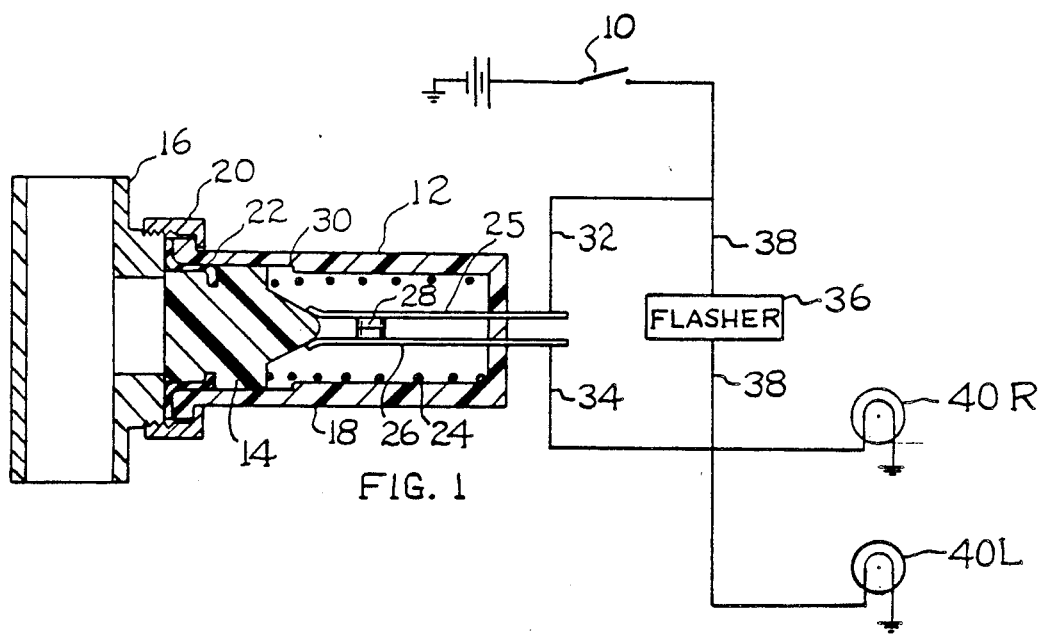
FIG. 1
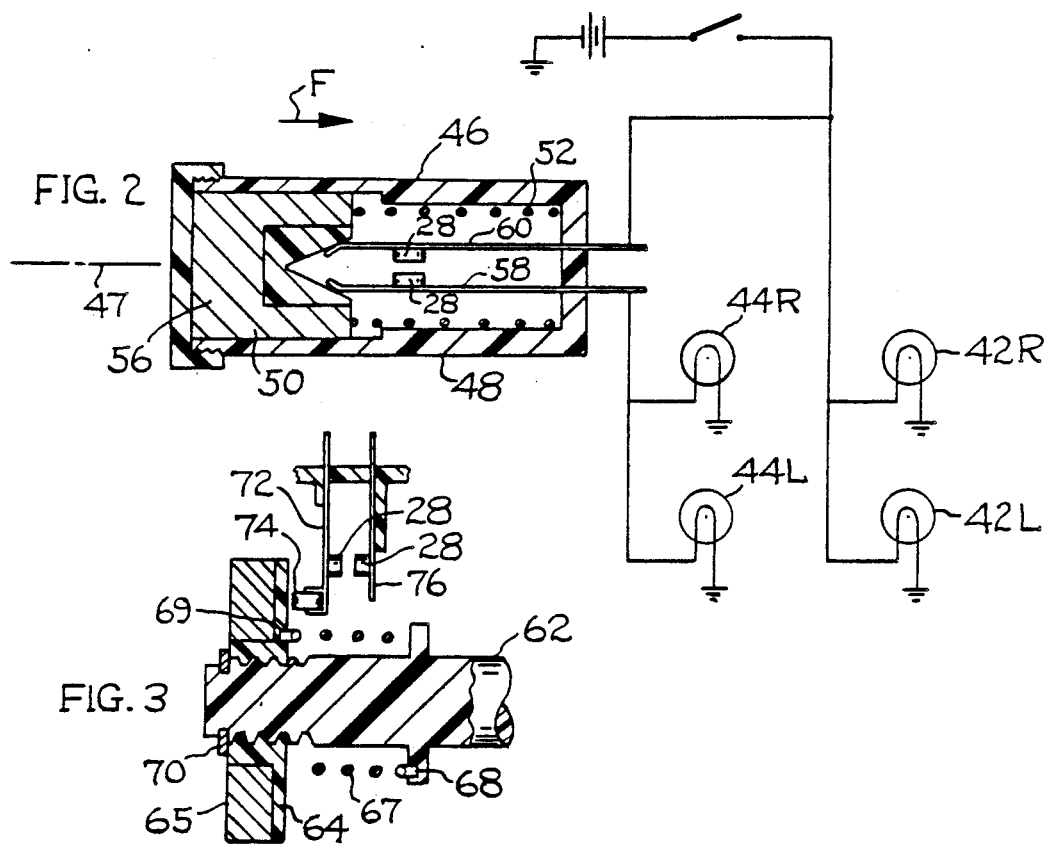
FIG. 2
FIG. 3

VEHICLE BRAKE INDICATOR SYSTEM

BACKGROUND AND SUMMARY OF THE INVENTION

This invention relates to automotive alarm circuits, and particularly to an alarm system that informs the driver a following vehicle when the driver of the leading vehicle is attempting to very rapidly decelerate his vehicle, e.g. stop the vehicle in a minimum distance to avoid a collision with another vehicle.

Many drivers tend to "ride" their brakes, i.e. to apply light foot pressure to the brake pedal for prolonged periods in order to minimize vehicle speed changes. The driver of the following vehicle sees the leading vehicle's brake lights go on and off frequently, without any appreciable discernible speed changes. Should a panic braking situation develop, e.g. an animal darting out into the street or another car running a red light at an intersection, the braking signal generated at the rear end of the leading vehicle will be indistinguishable from the signal generated at other times when the driver is merely riding the brake, i.e. slightly depressing the brake pedal. The driver of the following vehicle is liable not to take the signal seriously, thereby posing the danger of a rear end collision.

The present invention relates to a vehicle braking alarm system wherein alarm lamps at the rear end of the vehicle exhibit one signal when the brake pedal is lightly depressed and a second different signal when the brake pedal is depressed at an abnormally high (panic) rate. The following U.S. patents relate to vehicle braking alarm systems: U.S. Pat. No. 3,774,152 to J. Tandy, U.S. Pat. No. 3,949,361 to D. Replogle, U.S. Pat. No. 4,470,036 to J. Doerr, U.S. Pat. No. 4,631,516 to G. Clinker, and U.S. Pat. No. 4,812,807 to J. Davis. My invention is believed to represent a departure from these patents, in that none of these patents provides two different braking signals, dependent on the way that foot pressure is applied to the brake pedal.

THE DRAWINGS

FIG. 1 illustrates schematically a vehicle braking alarm system embodying my invention.

FIG. 2 schematically illustrate a second embodiment of the invention.

FIG. 3 illustrates a rotary inertia switch that can be used in the practice of my invention.

DESCRIPTION OF A PREFERRED EMBODIMENT OF THE INVENTION

FIG. 1 shows an automotive alarm circuit that includes a conventional brake switch 10 adapted to be closed in response to relatively light depression of the vehicle brake pedal; switch 10 can be an existing conventional brake switch. The circuitry includes a second switch 12 that responds to an abnormally high rate of depression of the brake pedal. This second switch is shown as a liquid pressure - responsive switch having an operating piston 14 communicating with the vehicle brake line, such that a step increase in brake line pressure is required to operate the switch. The term "step increase" is here used to mean a relatively steep pressure increase in a relatively short period of time; such a pressure increase is obtainable only when the driver pushes the pedal to the floor in a near-panic stop situation.

As shown in FIG. 1, the brake line includes a liquid coupling 16 inserted into the line that transmits hydraulic liquid pressure from the pedal to the various brake cylinders at the road wheels. A cup-shaped switch housing 18 is attached to liquid coupling 16, as by means of a threaded clamp collar 20. Piston 14 has a diaphragm type seal 22 clamped between flanges on the coupling and housing 18 via collar 20.

A compression coil spring 24 normally biases piston 14 to its illustrated position. The right end of the piston defines wedge-like cam surfaces engaged with end areas of switch arms 25 and 26 that extend through the end wall of housing 18. Each arm carries a switch contact 28.

Should the liquid pressure in coupling 16 abruptly rise, piston 14 will move rightwardly until it strikes shoulder 30; switch arms 24 and 25 will move apart to open the circuit through contacts 28. Switch 12 thus responds to step pressure increases in the brake line, to open the associated circuit comprised of circuit lines 32 and 34.

Switch 12 is in electrical parallelism with a conventional flasher device 36 located in a circuit line 38. The flasher and switch 12 are each in series with (between) brake switch 10 and two signal lamps 40R and 40L. Lamp 40R will be located at the rear of the vehicle to the right of the vehicle centerline. Lamp 40L will be located at the rear of the vehicle to the left of the vehicle centerline.

During periods when a relatively light foot pressure is applied to the brake pedal, current will flow from brake switch 10 through flasher 36 and also through normally closed switch 12. Lamps 40R and 40L will be continuously illuminated. When a very heavy foot pressure is applied to the brake pedal in a panic-stop situation switch 12 will open, such that current will flow to the lamps only through flasher 36. The lamps will be illuminated in pulses. The pulse type illumination will alert the driver in the following vehicle that the brake system is being operated in the panic (high deceleration) mode.

The FIG. 2 illustrates another system of the invention wherein there are four alarm lamps at the rear of the vehicle. When relatively slight pressure is applied to the brake pedal the two lamps 42R and 42L are energized (the other two lamps 44R and 44L are inactive). When heavy foot pressure is applied to the brake pedal lamps 44R and 44L are illuminated; the other two lamps will remain illuminated.

FIG. 2 circuit includes a linearly movable inertia switch 46 oriented so that its axis 47 is parallel to the movement axis of the vehicle. The switch includes a housing 48 containing a slidable piston 50. The piston is oriented behind the switch contact arms so that when the vehicle decelerates rapidly the piston 50 moves forwardly by inertia action, as designated by arrow F in FIG. 2. A compression spring 52 normally biases the piston in a rearward direction to its illustrated position. The piston is formed at least partially of a heavy metal, designated by numeral 56, to facilitate the inertia action.

Right end surfaces of the piston are configured as wedge-like cam surfaces in engagement with end areas of switch arms 58 and 60; the switch arms carry switch contacts 28. As the piston moves forwardly (rightwardly) the switch arms 58 and 60 move toward one another to close contacts 28.

Inertia switch 46 responds to heavy foot pressure on the brake pedal in a slightly different way than switch 12. In the case of switch 46 the response is to the actual vehicle deceleration produced by the brake pedal actuation, rather than step increase in brake line pressure. Spring 52 (FIG. 2) will be of sufficient strength to keep piston 50 in its FIG. 2 position during periods of relatively slight vehicle deceleration, e.g. normal slow down due to relatively slight foot pressure on the brake pedal.

FIG. 3 shows a rotary inertia switch that can be used in the FIG. 2 system (or the FIG. 1 system). The switch includes a driven (powered) shaft 62 connected directly or indirectly to one of the vehicle road wheels, such that the rotational speed of shaft 62 is related to the road wheel speed. When the road wheel rapidly decelerates shaft 62 similarly decelerates.

Shaft 62 has a screw thread connection with a floating inertia member 64 that includes a heavy metal section 65. A torsion spring 67 has its opposite ends 68 and 69 anchored respectively to shaft 62 and inertia member 64, to normally rotate member 64 to its FIG. 3 position engaged with a stop 70 on shaft 62.

Should shaft 62 rapidly decelerate the inertia of member 64 will cause it to rotate on the shaft and thereby advance in a left-to-right direction along the shaft. A deflectable switch arm 72 carries a roller 74 that comes into contact with inertia member 64; as member 64 moves to the right switch arm 72 is deflected toward switch arm 76, thereby closing the associated contacts 28, 28.

The rotary inertia switch of FIG. 3 responds to abrupt vehicle deceleration in essentially the same fashion as the FIG. 2 inertia switch, the essential difference being that the FIG. 2 switch responds to vehicle speed change whereas the FIG. 3 switch responds to speed changes in the road wheel drive system.

FIG. 1 shows a normally closed switch 12, whereas FIGS. 2 and 3 show normally open switches. However, the systems of FIGS. 1 and 2 can include either a normally closed switch (as in FIG. 1) or a normally open switch (as in FIGS. 2 or 3). The essential requirement of either system is that the visible signal generated by the lamp alarm system is different when the vehicle is rapidly decelerated, compared to the signal when the vehicle is only slightly decelerated.

What is claimed is:

1. An automotive alarm circuit comprising a first brake switch (10) closable in response to depression of a brake pedal: a lamp alarm system (40R, 40L) at the rear end of a vehicle; a second switch (12) responsive to vehicle deceleration associated with an abnormally high rate of depression of the brake pedal; a flasher 36; and circuit connections between the lamp alarm system and the flasher and the switches, whereby the lamp alarm system provides the following vehicle with one visible signal when the brake pedal is lightly depressed, and a second visible signal when the brake pedal is depressed at an abnormally high rate; said flasher and said second switch being in electrical parallelism with one another; said flasher and said second switch being in series between the first brake switch and said lamp system, whereby the flasher controls the lamp system when the second switch is open, and the second switch controls the lamp system when the second switch is closed;

said second switch being a liquid pressure-responsive switch having an operating connection with the vehicle brake line, whereby a step increase in brake line pressure is required to operate said second switch; said second switch comprising a cup-shaped housing (18) having an end wall and an open mouth portion, with said mouth portion being sealably connected to the brake line, a piston (14) slidably mounted within said housing for movement toward or away from the brake line, a compression coil spring (24) biasing said piston toward the brake line, and two deflectable switch arms (25, 26) extending through the end wall of the housing into the space circumscribed by the coil spring; said piston being aligned with said switch arms to deflect said arms when the piston is moved away from the brake line.

* * * * *